(12) United States Patent
Carneiro et al.

(10) Patent No.: US 11,155,359 B2
(45) Date of Patent: Oct. 26, 2021

(54) AIRCRAFT FUEL TANK PRESSURIZATION SYSTEMS AND METHODS

(71) Applicant: EMBRAER S.A., São José dos Campos (BR)

(72) Inventors: Breno Garcia Carneiro, São José dos Campos (BR); Gustavo Amaral Ferreira De Melo, São José dos Campos (BR); Marcus Tullio Balthazar Bressan, São José dos Campos (BR); Pedro Geraldo Linguanotto, São José dos Campos (BR); Andrei Testi, São José dos Campos (BR)

(73) Assignee: EMBRAER S.A., São José Dos Campos (BR)

( * ) Notice: Subject to any disclaimer, the term of this patent is extended or adjusted under 35 U.S.C. 154(b) by 130 days.

(21) Appl. No.: 16/575,826

(22) Filed: Sep. 19, 2019

(65) Prior Publication Data

US 2021/0086908 A1    Mar. 25, 2021

(51) Int. Cl.
*B64D 37/10*      (2006.01)
*B64D 37/34*      (2006.01)
*B64D 37/32*      (2006.01)

(52) U.S. Cl.
CPC .............. *B64D 37/10* (2013.01); *B64D 37/34* (2013.01); *B64D 37/32* (2013.01)

(58) Field of Classification Search
CPC ........ B64D 37/00; B64D 37/02; B64D 37/04; B64D 37/06; B64D 37/08; B64D 37/10; B64D 37/32; B64D 37/34; B60K 2015/03296; B60K 2015/03585
See application file for complete search history.

(56) References Cited

U.S. PATENT DOCUMENTS

| | | |
|---|---|---|
| 2,749,062 A | 6/1956 | MacIntyre |
| 9,758,255 B1 | 9/2017 | Kirk et al. |
| 2006/0021652 A1 | 2/2006 | Surawski |
| 2015/0151845 A1 | 6/2015 | Jones |
| 2015/0217153 A1 | 8/2015 | Jones |
| 2017/0283083 A1* | 10/2017 | Behbahani-Pour ...... A62C 3/08 |

* cited by examiner

*Primary Examiner* — Joshua J Michener
*Assistant Examiner* — Colin Zohoori
(74) *Attorney, Agent, or Firm* — Nixon & Vanderhye P.C.

(57) ABSTRACT

Systems and methods are provided for storage in at least one on-board fuel tank of aircraft fuel under a predetermined pressure and at an internal ambient tank temperature. A passive heat exchanger having an exchanger inlet is fluid-connected to a propulsion engine of the aircraft to receive heated pressurized bleed air therefrom while an exchanger outlet is fluid connected to the fuel tank. The passive heat exchanger is configured to cool the heated pressurized bleed air from the engine by heat transfer to a surrounding environment by radiation and convection so as to supply pressurization air to the fuel tank at the predetermined internal tank pressure and the internal ambient tank temperature. A system controller is provided to provide the fuel tank with pressurized air at a predetermined temperature during various aircraft flight phases.

13 Claims, 2 Drawing Sheets

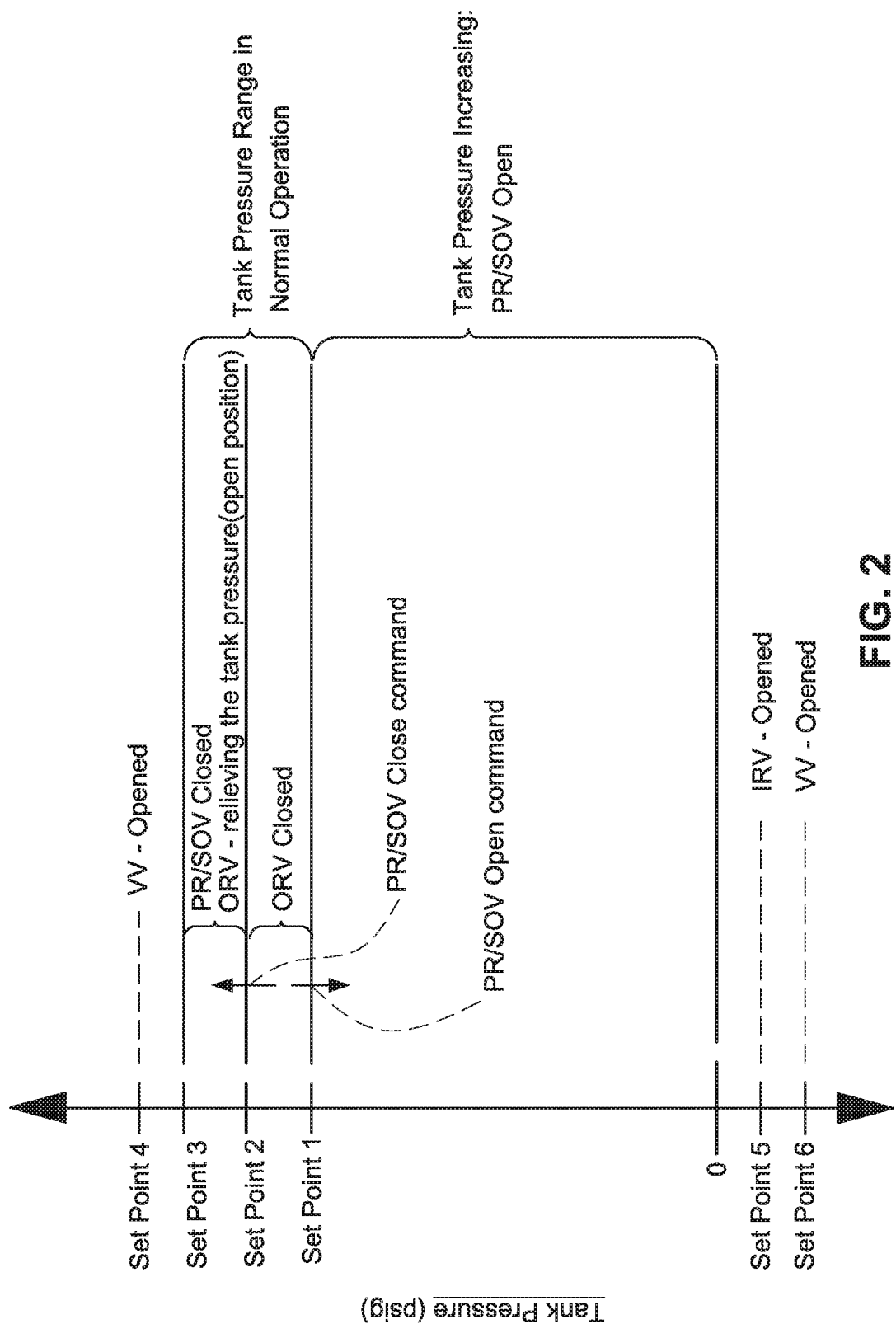

AIRCRAFT FUEL TANK PRESSURIZATION SYSTEMS AND METHODS

FIELD

Figure 1:
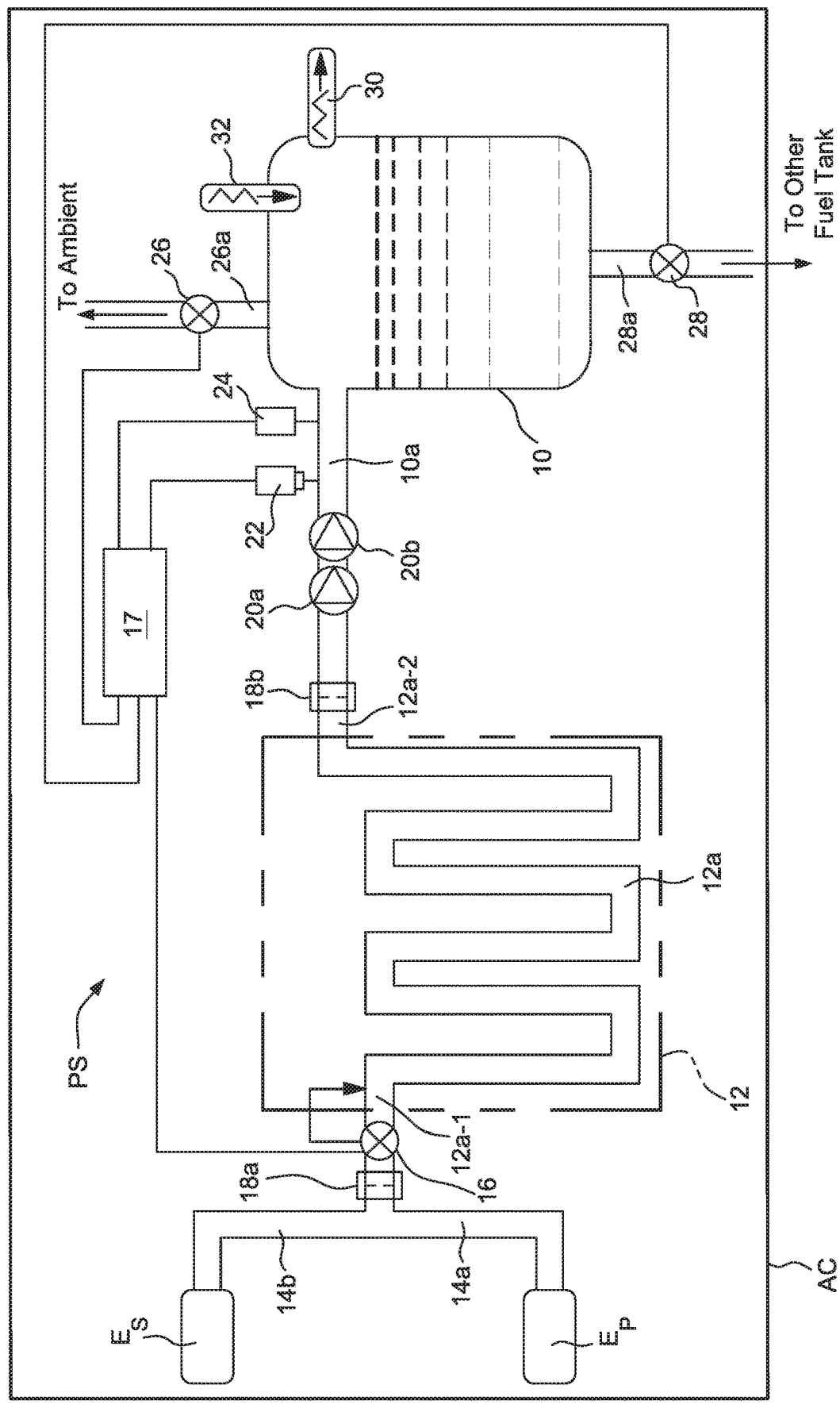

The embodiments disclosed herein relate generally to aircraft having on-board auxiliary fuel tanks. In especially preferred forms, the embodiments disclosed herein relate to aircraft auxiliary fuel tanks that are provided with a fuel tank pressurization system to provide for reduced flammability risks and to allow pressurized fuel transfer to another on-board fuel tank (e.g., a main fuel tank and/or another auxiliary fuel tank that is less full).

BACKGROUND

It is well known that on-board aircraft fuel tanks possess a risk of explosion due to the highly flammable fuel carried therein. The art therefore has developed several proposals in order to reduce the flammability risks associated with on-board aircraft fuel tanks, as evidenced, for example, by U.S. Pat. Nos. 2,749,062 and 9,758,255 and U.S. Patent Application Publications 2006/0021652, 2015/0151845 and 2015/0217153 (the entire content of each such patent and published application being expressly incorporated hereinto by reference).

By way of example, one technique known in the art to reduce the flammability risks associated with on-board aircraft fuel tanks is to pressurize the tanks using bleed air from the aircraft turbofan engines, e.g., either the main propulsion turbofan engines or the turbofan associated with the on-board auxiliary power unit (APU). Tank pressurization reduces the highly volatile layer of fuel vapor inside the tanks thereby reducing the flammability and hence explosiveness of the fuel. However, since engine bleed air is too hot (typically in excess of 200° C.) to introduce directly into the fuel tank for the purpose of tank pressurization, it must first be cooled. Prior proposals have therefore focused on the use of active heat exchangers that employ chilled air as the working heat exchange fluid obtained either from an on-board chiller unit (e.g., an on-board air conditioning unit) and/or colder aircraft external ram air. Such prior proposals typically will therefore take the cold air from ram airflow and direct it to pre-cooler, where the heat exchange with the engine bleed air occurs. Some form of active control valve system is typically employed to control the cold airflow and temperature sensors to measure the temperature of the output airflow. Disadvantageously, however, the implementation of these conventional systems is complex and expansive.

Some other known methods to reduce flammability also rely on the use of an inert gas, such as nitrogen, within the tanks to displace the oxygen content therewithin. However, providing on-board nitrogen sources is a costly solution that is typically not pursued in commercial aviation.

It would therefore be desirable if systems and methods were provided to pressurize on-board aircraft fuel tanks to thereby reduce flammability risks and allow for pressurized fuel transfer to another on-board tank that were less complex and thereby more economical to implement. It is towards providing such systems and methods that the embodiments disclosed herein are directed.

BRIEF DESCRIPTION OF EMBODIMENTS

Broadly, the embodiments disclosed herein are directed toward systems and methods by which an on-board fuel tank can be pressurized within normal tank internal pressure and temperature conditions. According to some embodiments, systems and methods are provided whereby at least one on-board fuel tank is capable of storing aircraft fuel under a predetermined internal tank pressure and at an internal ambient tank temperature, the fuel tank having a tank inlet for receiving pressurization air, a tank outlet for discharging fuel from the tank and a tank vent line. A passive heat exchanger having an exchanger inlet is fluid-connected to a propulsion engine of the aircraft to receive heated pressurized bleed air therefrom while an exchanger outlet is fluid connected to the fuel tank. The passive heat exchanger is configured to cool the heated pressurized bleed air from the engine by heat transfer to a surrounding environment by radiation and convection so as to supply pressurization air to the fuel tank at the predetermined internal tank pressure and the internal ambient tank temperature.

Inlet and outlet fixed calibrated orifices may be positioned in the inlet and the outlet of the passive heat exchanger for controllably limiting flow of the bleed air from the engine to the heat exchanger and to the fuel tank, respectively. A pressure regulating/shutoff valve (PR/SOV) is positioned in the inlet of the heat exchanger downstream of the inlet orifice and is provided with opened and closed conditions to respectively fully supply and fully stop flow of the pressurized bleed air to the heat exchanger. A system controller is operatively connected to the PR/SOV for modulating the PR/SOV between open and closed conditions to thereby maintain pressure and temperature conditions of the pressurization air supplied to the tank by the heat exchanger within predetermined pressure and temperature set point conditions.

Pressure and temperature sensors may be positioned in the tank inlet for sensing the pressure and temperature conditions of the pressurization air supplied to the tank inlet from the exchanger outlet and issuing respective pressure and temperature condition signals to the system controller if the pressure and temperature conditions are outside a predetermined range. The system controller in response to receipt of the pressure and/or temperature condition signals may thereby issue a command signal to modulate the PR/SOV and thus maintain the pressure and temperature conditions of the pressurization air supplied to the tank inlet from the heat exchanger within the predetermined range.

Certain embodiments will provide the fuel tank a normally closed positive pressure outflow relief valve (ORV) and a normally closed negative pressure inflow relief valve (IRV). Each of the ORV and the IRV is preferably a normally closed pressure relief valve which opens in response to an internal tank pressure condition exceeding a mechanically preset pressure condition set point thereof to thereby maintain the internal tank pressure within maximum and minimum design pressure conditions thereof. By way of example, the ORV may have a preset pressure condition set point at a maximum operating internal tank pressure while the IRV may have a preset pressure condition set point a minimum operating internal tank pressure (e.g., less than 0 psig).

The system controller may be programmed to include first and second pressure set points which respectively establish a first internal pressure condition of the fuel tank and a second internal pressure condition of the fuel tank which is greater than the first internal pressure condition. These first and second internal pressure conditions thereby establish lower and upper pressure limits of a normal range of internal tank pressure conditions during operation. During an aircraft climb (when the pressure internally of the tank will increase relative to the ambient pressure conditions), the system controller will maintain the PR/SOV in the opened position until receiving a pressure signal from the pressure sensor that the internal tank pressure has reached the first pressure set point. At this time the system controller responsively issues a command signal to cause the PR/SOV to move to the closed position thereof. In such an embodiment, the mechanically present pressure condition of the ORV will preferably correspond to the second pressure set point such that the normally closed ORV opens upon the internal tank pressure reaching the second set point pressure to thereby maintain the internal tank pressure within the normal range of internal tank pressure conditions.

The system controller may also be programed to include a third pressure set point that is less than the first pressure set point to thereby establish a establish a third internal pressure condition of the fuel tank which is less than the lower pressure limit of the normal range of internal tank pressure conditions established by the first pressure set point. During an aircraft descent (i.e., where the internal tank pressure decreases relative to the ambient pressure conditions), the system controller maintains the PR/SOV in the closed position until receiving a pressure signal from the pressure sensor that the internal tank pressure has reached the third pressure set point at which time the system controller issues a command signal to cause the PR/SOV to move to the opened position thereof.

According to certain embodiments, the fuel tank will include a fuel transfer valve positioned in the tank outlet and operatively connected to the system controller. The system controller will also preferably be programed to include a third pressure set point that is less than the first pressure set point to thereby establish a establish a third internal pressure condition of the fuel tank which is less than the lower pressure limit of the normal range of internal tank pressure conditions established by the first pressure set point. During a fuel transfer mode (e.g., when fuel is transferred from the fuel tank to another on-board fuel tank), the system controller will issue a command signal to cause the fuel transfer valve to open and thereby allow fuel under pressure within the fuel tank to flow through the tank outlet which in turn causes the internal pressure within the fuel tank decease. During such fuel transfer mode, therefore, the system controller may issue a further command signal to cause the PR/SOV to open in response to the internal pressure within the fuel tank decreasing to the third pressure set point to thereby increase the pressure within the tank.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIG. 1 is schematic view of an on-board aircraft fuel tank pressurization system in accordance with an embodiment of this invention; and FIG. 2 is a graphical representation of the control scheme employed by the embodiment of the aircraft fuel tank pressurization system depicted in FIG. 1.

DETAILED DESCRIPTION OF EMBODIMENTS

As is schematically depicted in accompanying FIG. 1, an aircraft AC is provided with an on-board fuel tank pressurization system PS so as to provide pressurized air via bleed air conduits from the port and starboard engines Ep, Es to an on-board auxiliary fuel tank 10. Important to the embodiment shown, the pressurization system PS is provided with a passive heat exchanger 12 which includes a heat exchange conduit 12a sinusoidally disposed between the inlet 12a-1 and outlets 12a-2 thereof. The effective length of the heat exchange conduit 12a between its inlet 12a-1 and outlet 12a-2 is determined by the airflow rate and residence time therewithin as controlled in the manner to be discussed in greater detail below.

Pressurized heated bleed air via conduits 14a, 14b is extracted from the port and starboard engines Ep, Es, respectively, and introduced into the heat exchanger 12 at the inlet 12a-1 thereof. The principal function of the heat exchanger 12 is to cool the hot bleed air within the passive heat exchange tube 12a via radiation/convection to the ambient environment so that the pressurized bleed air may be cooled to ambient air temperature and introduced into the auxiliary fuel tank 10.

In order to achieve the cooling of the hot pressurized bleed air, the passive heat exchanger 12 is provided with a pressure regulating/shutoff valve (PR/SOV) 16 which is capable of completely blocking or modulating airflow from the bleed air conduits 14a, 14b into the inlet 12a-1 of the heat exchanger 12. The PR/SOV 16 is commanded by appropriate signals from the on-board system controller 17 that activates the pressurization system PS. When functioning as a pressure regulator, the PR/SOV 16 will serve to reduce the pressure of the hot bleed air obtained via the conduits 14a, 14b being introduced into the inlet 12a-1 of heat exchanger 12 to an intermediate pressure condition as compared to the higher pressure condition of the bleed air when extracted from the engines Ep, Es. When functioning as a shutoff valve, the PR/SOV 16 will either completely shut off the bleed air flow from conduits 14a, 14b to the inlet 12a-1 or allow all of the bleed air flow from the conduits 14a, 14b to be transferred to the inlet 12a-1.

An inlet stationary orifice plate 18a is provided upstream of the PR/SOV 16 in the inlet 12a-1 of the heat exchanger 12 while an outlet stationary orifice plate 18b is provided in the outlet 12a-2 of the heat exchanger. The outlet orifice plate 18b is calibrated to provide the desired airflow to pressurize the auxiliary fuel tank 10, while the inlet stationary orifice plate 18a is calibrated to limit the airflow in the event the PR/SOV 16 fails and to limit the airflow to avoid a temperature increase within the auxiliary fuel tank 10. The diameter of the orifice plate 18a is thereby designed to not allow the airflow temperature to exceed the maximum temperature allowed within the auxiliary fuel tank 10. As one non-limiting example, the diameter of the orifice plate 18a is designed so as to be about 25%+/− of the diameter of the heat exchange conduit 12a. This size relationship between the orifice plate 18a and the diameter of the heat exchange tube 12a is determined according to the pressure and airflow levels of the extracted bleed air introduced to the pressurization system PS, the effective length of the heat exchange conduit 12a, and the maximum designed inlet temperature to the auxiliary fuel tank 10 when considering a failure condition.

In order to avoid reverse airflow from the auxiliary fuel tank 10 to the heat exchanger 12, a pair of check valves 20a, 20b may be provided downstream of the orifice plate 18b.

The auxiliary fuel tank 10 will include a tank inlet 10a in fluid communication with the outlet 12a-2 of the heat exchanger 12 and in which a pressure sensor (transducer) 22 and temperature sensor 24 are operatively disposed. The auxiliary fuel tank 10 will also be provided with a vent line 26a in which a venting valve (VV) 26 operatively positioned as well as a fuel transfer line 28a in which a fuel transfer valve 28 is operatively positioned. As shown, the vent line 26a serves to vent air pressure to the ambient environment of the tank 10 while the fuel transfer line is fluid-connected to another on-board fuel tank (not shown), such as the aircraft's main fuel tank or a second auxiliary fuel tank having a low fuel level therein.

The fuel tank 10 is provided with positive pressure outflow relief valve (ORV) 30 and a negative pressure inflow relief valve (IRV) 32 which ensures that the pressure within the tank 10 is maintained between proper maximum and minimum design pressure conditions. Each of the valves 30, 32 is a normally closed mechanically preset pressure relief valve which opens upon the pressure within the tank 10 exceeding the mechanically preset pressure condition set point thereof.

In operation, the system controller 17 will issue a command signal to the PR/SOV 16 in order to pressurize the auxiliary fuel tank 10 according to the sensed pressure and temperature conditions in the tank inlet 10a sensed by the pressure and temperature sensors 22 and 24, respectively.

During a climb, the ambient external pressure to the aircraft will decrease due to decease in atmospheric pressure so that the differential pressure between the pressure within the tank 10 and the ambient pressure will increase. Therefore, the system controller will maintain the PR/SOV 16 in an opened position until the tank pressure reaches the Set Point 2 in FIG. 2. During a climb mode, the tank pressure will increase to values above the Set Point 2 even with the PR/SOV 16 in a closed position. In this flight phase, the ORV 30 will function to relieve the tank pressure in order to prevent the tank pressure exceeding the Set Point 3 in FIG. 2.

During a descent, the internal pressure within the tank 10 will of course decrease due to an increase in the atmospheric pressure external to the aircraft AC. The system controller 17 will command the PRXOV 16 to the open position in case of tank pressure decreasing to values less than Set Point 1 in FIG. 2 and thereby maintain the tank pressure above the Set Point 1 in FIG. 2.

The pressurization system 10 is also provided with fail safe modes. In this regard, in case of failure of the ORV 30, the pressure within the tank 10 can increase during a climb of the aircraft AC so as to reach a value above the upper pressure limit of normal operation (Set Point 3 in FIG. 2). In such a situation, the system controller would issue a command signal to the VV valve 26 upon the pressure sensor 22 sensing a maximum pressure condition within tank 10 identified in FIG. 2 as Set Point 4 causing the VV 26 to open and thereby allow excess pressure to vent from the tank 10 to the ambient environment. The system controller 17 could also issue an aural or visual annunciation signal to the flight crew to alert them that a relief ORV 30 has failed.

During a descent mode, should the PR/SOV 16 fail in a closed position, then the pressure internal to the tank 10 could possibly fall to below 0 psig. If such a condition exists, therefore, the IRV 32 will be caused to open upon reaching IRV 30 mechanically preset pressure condition point (identified in FIG. 2 as Set Point 5) thereby allowing the pressure within the tank 10 to once again be pressurized until no negative pressure condition exists, at which time the IRV 32 will once again mechanically close. If the IRV 32 should fail, then the controller 17 will issue a command signal to the VV 26 upon the pressure within tank 10 reaching the maximum negative pressure condition identified by Set Point 6 thereby causing VV26 to open allowing the internal pressure condition of the tank 10 to be equalized with the ambient pressure external to the tank 10. The system controller 17 could also issue an aural or visual annunciation signal to the flight crew to alert them that a relief IRV 32 has failed. By way of example only, the maximum pressure allowed within the tank could be between 12 psig (Set Point 4) and −1 psig (Set Point 6) and is determined according to the structural design of the tank.

During a fuel transfer mode when a fuel transfer from the tank 10 to another on-board fuel tank (not shown) is required to be made while the pressurization system is functioning to maintain pressure within the tank 10 within the normal operational pressure range between Set Points 1 and 3, the controller 17 will issue a command signal to the fuel transfer valve 28 causing it to open and allow fuel to be discharged under pressure through the fuel transfer line 28a. Such a fuel transfer operation will thus cause the pressure internal within the tank 10 to decrease below the lower limit of normal pressure operation (Set Point 1). At this point, the PR/SOV 16 will be commanded to the open position and the tank pressure will increase from Set Point 1 to Set Point 2 in FIG. 2, at which time the PR/SOV is commanded to the closed position. This repeated cycling of the PR/SOV 16 between closed and opened positions will therefore maintain the internal pressure within tank 10 within a fuel transfer pressure operational range determined by the pressure range between Set Points 1 and 2. Such a cycling of the PR/SOV 16 therefore is an example of the valve functioning as an "on-off" valve with hysteresis and allows the pumpless transfer of fuel from tank 10 to another on-board fuel tank (i.e., fuel transfer is achieved solely by means of the pressure condition with the tank 10 thereby avoiding the need for a fuel transfer pump and its associated systems).

Therefore, while reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. An aircraft fuel tank pressurization system comprising:
   at least one on-board fuel tank for storage of aircraft fuel under a predetermined internal tank pressure and at an internal ambient tank temperature, the fuel tank having a tank inlet for receiving pressurization air, a tank outlet for discharging fuel from the tank and a tank vent line;
   a passive heat exchanger having an exchanger inlet fluid-connected to a propulsion engine of the aircraft to receive heated pressurized bleed air therefrom, and an exchanger outlet fluid connected to the fuel tank, the passive heat exchanger being configured to cool the heated pressurized bleed air from the engine by heat transfer to a surrounding environment by radiation and convection so as to supply pressurization air to the fuel tank at the predetermined internal tank pressure and the internal ambient tank temperature;
   inlet and outlet fixed calibrated orifices positioned in the inlet and the outlet of the passive heat exchanger for controllably limiting flow of the bleed air from the engine to the heat exchanger and to the fuel tank, respectively, a pressure regulating/shutoff valve (PR/SOV) positioned in the inlet of the heat exchanger downstream of the inlet orifice and having opened and closed conditions to respectively fully supply and fully stop flow of the pressurized bleed air to the heat exchanger;

a system controller operatively connected to the PR/SOV for modulating the PR/SOV between open and closed conditions to maintain pressure and temperature conditions of the pressurization air supplied to the tank by the heat exchanger within predetermined pressure and temperature set point conditions, and pressure and temperature sensors positioned in the tank inlet for sensing the pressure and temperature conditions of the pressurization air supplied to the tank inlet from the exchanger outlet and issuing respective pressure and temperature condition signals to the system controller if the pressure and temperature conditions are outside a predetermined range, wherein the system controller in response to receipt of the pressure and/or temperature condition signals issues a command signal to modulate the PR/SOV and thereby maintain the pressure and temperature conditions of the pressurization air supplied to the tank inlet from the heat exchanger within the predetermined range; wherein the fuel tank further comprises a normally closed positive pressure outflow relief valve (ORV) and a normally closed negative pressure inflow relief valve (IRV), wherein each of the ORV and the IRV is a normally closed pressure relief valve which opens in response to an internal tank pressure condition exceeding a mechanically preset pressure condition set point thereof to thereby maintain the internal tank pressure within maximum and minimum design pressure conditions thereof; and wherein the system controller comprises first and second pressure set points which respectively establish a first internal pressure condition of the fuel tank and a second internal pressure condition of the fuel tank which is greater than the first internal pressure condition and thereby establish lower and upper pressure limits of a normal range of internal tank pressure conditions, and wherein during an aircraft climb, the system controller maintains the PR/SOV in the opened position until receiving a pressure signal from the pressure sensor that the internal tank pressure has reached the first pressure set point at which time the system controller issues a command signal to cause the PR/SOV to move to the closed position thereof, and wherein the mechanically present pressure condition of the ORV corresponds to the second pressure set point such that the normally closed ORV opens upon the internal tank pressure reaching the second set point pressure to thereby maintain the internal tank pressure within the normal range of internal tank pressure conditions; and wherein the fuel tank further comprises a vent valve (VV) positioned in the tank vent line and operatively connected to the system controller, and wherein the system controller issues a command signal to open the VV in response to receiving a pressure signal from the pressure sensor that the internal tank pressure has reached a pressure condition that is greater than the second internal tank pressure condition to thereby allow internal pressure within the fuel tank to vent to ambient environment through the tank vent line.

2. The aircraft fuel tank pressurization system according to claim 1, wherein the system controller comprises a third pressure set point that is less than the first pressure set point to thereby establish a establish a third internal pressure condition of the fuel tank which is less than the lower pressure limit of the normal range of internal tank pressure conditions established by the first pressure set point; and wherein during an aircraft descent, the system controller maintains the PR/SOV in the closed position until receiving a pressure signal from the pressure sensor that the internal tank pressure has reached the third pressure set point at which time the system controller issues a command signal to cause the PR/SOV to move to the opened position thereof.

3. The aircraft fuel tank pressurization system according to claim 1, wherein the fuel tank comprises a fuel transfer valve positioned in the tank outlet and operatively connected to the system controller, and wherein the system controller comprises a third pressure set point that is less than the first pressure set point to thereby establish a establish a third internal pressure condition of the fuel tank which is less than the lower pressure limit of the normal range of internal tank pressure conditions established by the first pressure set point; and wherein during a fuel transfer mode, the system controller issues a command signal to cause the fuel transfer valve to open and thereby allow fuel under pressure within the fuel tank to flow through the tank outlet which in turn causes the internal pressure within the fuel tank to decrease, and wherein during the fuel transfer mode, the system controller issues a further command signal to cause the PR/SOV to open in response to the internal pressure within the fuel tank decreasing to a third pressure set point which establishes a third internal fuel tank pressure condition which is lower than the first fuel tank pressure condition.

4. The aircraft fuel tank pressurization system according to claim 1, wherein the mechanically preset pressure condition set point of the IRV is less than 0 psig.

5. The aircraft fuel tank pressurization system according to claim 3, wherein the system controller comprises a fourth pressure set point that is greater than the second pressure set point to thereby establish a fourth internal pressure condition of the fuel tank which is greater than the upper pressure limit of the normal range of internal tank pressure conditions established by the second pressure set point; and wherein in the event of failure of the ORV, the system controller issues a command signal to open the VV in response to receiving a pressure signal from the pressure sensor that the internal tank pressure has reached the fourth internal pressure condition to thereby allow internal pressure within the fuel tank to vent to ambient environment through the tank vent line.

6. The aircraft fuel tank pressurization system according to claim 5, wherein the mechanically preset pressure condition set point of the IRV establishes a fifth pressure set point which is less than 0 psig such that the IRV opens to allow ambient air into the fuel tank in response to the internal tank pressure reaching the fifth set point.

7. The aircraft fuel tank pressurization system according to claim 6, wherein the system controller comprises a sixth pressure set point that is less than the fifth pressure set point to thereby establish a establish a sixth internal pressure condition of the fuel tank which is less than the mechanically preset pressure condition set point of the IRV; and wherein in the event of failure of the IRV, the system controller issues a command signal to open the VV in response to receiving a pressure signal from the pressure sensor that the internal tank pressure has reached the sixth internal pressure condition to thereby allow ambient air pressure into the fuel tank through the tank vent line.

8. An aircraft which comprises the aircraft fuel tank pressurization system according to claim 1.

9. A method of pressurizing an on-board fuel tank of an aircraft comprising:
(a) establishing fluid connection between an exchanger inlet of a passive heat exchanger and a propulsion engine of the aircraft to receive heated pressurized bleed air therefrom;
(b) establishing fluid connection between an exchanger outlet of the heat exchanger and a tank inlet of the fuel tank;
(c) allowing the passive heat exchanger to cool the heated pressurized bleed air from the engine by heat transfer to a surrounding environment by radiation and convection so as to supply pressurization air to the fuel tank at a predetermined internal tank pressure and internal ambient tank temperature;
(d) positioning inlet and outlet fixed calibrated orifices in the exchanger inlet and the exchanger outlet of the passive heat exchanger and respectively controllably limiting flow of the bleed air from the engine to the heat exchanger and to the fuel tank by the orifices;
(e) providing a pressure regulating/shutoff valve (PR/SOV) in the inlet of the heat exchanger downstream of the inlet orifice and having opened and closed conditions to respectively fully supply and fully stop flow of the pressurized bleed air to the heat exchanger;
(f) providing pressure and temperature sensors positioned in a tank inlet for sensing pressure and temperature conditions of the pressurization air supplied to the tank inlet from the exchanger outlet and issuing respective pressure and temperature condition signals to a system controller if the pressure and temperature conditions are outside a predetermined range,
(g) causing the system controller to issue command signals to the PR/SOV in response to the pressure and temperature signals from the pressure and temperature sensors to modulate the PR/SOV between the opened and closed conditions and thereby maintain pressure and temperature conditions of the pressurization air supplied to the tank by the heat exchanger within predetermined pressure and temperature set point conditions,
(h) providing the fuel tank further with a positive pressure outflow relief valve (ORV) and a normally closed negative pressure inflow relief valve (IRV);
(i) allowing each of the ORV and the IRV to open in response to an internal tank pressure condition exceeding a mechanically preset pressure condition set point thereof to thereby maintain the internal tank pressure within maximum and minimum design pressure conditions,
(j) providing first and second pressure set points within the system controller which respectively establish a first internal pressure condition of the fuel tank and a second internal pressure condition of the fuel tank which is greater than the first internal pressure condition and thereby establish lower and upper pressure limits of a normal range of internal tank pressure conditions,
(k) during an aircraft climb, causing the system controller to maintain the PR/SOV in the opened position until receiving a pressure signal from the pressure sensor that the internal tank pressure has reached the first pressure set point and thereafter causing the system controller to issue a command signal to cause the PR/SOV to move to the closed position thereof, and
(l) providing the ORV with a mechanically present pressure condition corresponding to the second pressure set point and allowing the normally closed ORV to open upon the internal tank pressure reaching the second set point pressure to thereby maintain the internal tank pressure within the normal range of internal tank pressure conditions,
(m) providing a vent valve (VV) in a tank vent line of the fuel tank and operatively connecting the VV to the system controller; and
(n) causing the system controller to issue a command signal to open the VV in response to receiving a pressure signal from the pressure sensor that the internal tank pressure has reached a pressure condition that is greater than the second internal tank pressure condition to thereby allow internal pressure within the fuel tank to vent to ambient environment through the tank vent line.

10. The method according to claim 9, which further comprises:
(o) providing the system controller with a third pressure set point that is less than the first pressure set point to thereby establish a establish a third internal pressure condition of the fuel tank which is less than the lower pressure limit of the normal range of internal tank pressure conditions established by the first pressure set point; and
(p) during an aircraft descent, causing the system controller to maintain the PR/SOV in the closed position until receiving a pressure signal from the pressure sensor that the internal tank pressure has reached the third pressure set point and thereafter causing the system controller to issue a command signal to cause the PR/SOV to move to the opened position thereof.

11. The method according to claim 9, which further comprises:
(o) positioning a fuel transfer valve in a tank outlet and operatively connecting the fuel transfer valve to the system controller;
(p) providing the system controller with a third pressure set point that is less than the first pressure set point to thereby establish a establish a third internal pressure condition of the fuel tank which is less than the lower pressure limit of the normal range of internal tank pressure conditions established by the first pressure set point; and
(q) during a fuel transfer mode, allowing the system controller to issue command signals to the fuel transfer valve and/or the PR/SOV to cause:
(1) the fuel transfer valve to open and thereby allow fuel under pressure within the fuel tank to flow through the tank outlet which in turn causes the internal pressure within the fuel tank to decrease, and
(2) the PR/SOV to open in response to the internal pressure within the fuel tank decreasing to a third pressure set point which establishes a third internal fuel tank pressure condition which is lower than the first fuel tank pressure condition.

12. The method according to claim 9, which comprises providing the IRV with a mechanically preset pressure condition set point which is less than 0 psig.

13. The method according to claim 9, which further comprises:
(o) providing the system controller with a fourth pressure set point that is greater than the second pressure set point to thereby establish a fourth internal pressure condition of the fuel tank which is greater than the upper pressure limit of the normal range of internal tank pressure conditions established by the second pressure set point; and
(p) in the event of failure of the ORV, causing the system controller to issue a command signal to open the VV in response to receiving a pressure signal from the pressure sensor that the internal tank pressure has reached the fourth internal pressure condition to thereby allow internal pressure within the fuel tank to vent to ambient environment through the tank vent line.

* * * * *